(12) United States Patent
Murdza

(10) Patent No.: US 7,248,369 B2
(45) Date of Patent: Jul. 24, 2007

(54) TEMPERATURE STABILIZED SINGLE MODE FIBER CONNECTORS IN SEMICONDUCTOR SOURCE SPECTROSCOPY SYSTEM

(75) Inventor: Randal A. Murdza, North Andover, MA (US)

(73) Assignee: Axsun Technologies, Inc., Billerica, MN (US)

( * ) Notice: Subject to any disclaimer, the term of this patent is extended or adjusted under 35 U.S.C. 154(b) by 106 days.

(21) Appl. No.: 11/203,810

(22) Filed: Aug. 15, 2005

(65) Prior Publication Data
US 2007/0035741 A1    Feb. 15, 2007

(51) Int. Cl.
*G01N 21/59*    (2006.01)

(52) U.S. Cl. ............ 356/451; 356/326; 356/432

(58) Field of Classification Search ........ 356/326–328, 356/432, 451, 454
See application file for complete search history.

(56) References Cited

U.S. PATENT DOCUMENTS

| | | | |
|---|---|---|---|
| 5,835,645 A | * | 11/1998 | Jorgenson et al. ............ 385/12 |
| 2003/0174969 A1 | * | 9/2003 | Vodrahalli et al. ............ 385/53 |
| 2005/0017178 A1 | * | 1/2005 | Ogawa et al. ......... 250/339.07 |
| 2005/0083533 A1 | * | 4/2005 | Atia et al. .................. 356/454 |
| 2006/0132782 A1 | * | 6/2006 | Flanders et al. ............ 356/432 |

* cited by examiner

*Primary Examiner*—Samuel A. Turner
(74) *Attorney, Agent, or Firm*—Houston Eliseeva LLP

(57) ABSTRACT

A method and system for controlling the temperature of the single mode fiber connectors and single mode, polarization maintaining fiber connectors, which that are used in the semiconductor source spectroscopy systems, is described to stabilize the system against baseline drift. Research and modeling has identified the source of thermally induced shifting to the single mode fiber connectors and single mode, polarization maintaining fiber connectors that are used to assemble the semiconductor source spectroscopy systems.

17 Claims, 2 Drawing Sheets

TEMPERATURE STABILIZED SINGLE MODE FIBER CONNECTORS IN SEMICONDUCTOR SOURCE SPECTROSCOPY SYSTEM

BACKGROUND OF THE INVENTION

Most spectroscopy systems fall into one of two categories. They can be tunable source systems that generate a wavelength tunable optical signal that is scanned over a wavelength scan band. A detector is then used to detect the tunable optical signal after interaction with the sample. The time response of the detector corresponds to the spectral response of the sample. Such systems are typically referred to as pre-dispersive. Alternatively, a tunable detector system can be used. In this case, a broadband optical signal is used to illuminate the sample. Then, signal from the sample is passed through an optical bandpass filter or grating, which is tuned over the scan band such that a detector time response detector array response is used to resolve the sample's spectrum. Such systems are typically referred to as post-dispersive.

Between tunable source and tunable detector systems, tunable source systems have some advantages. They can have a better response for the same optical power transmitted to the sample. That is, tunable detector systems must illuminate the sample with a broadband signal that covers the entire scan band. Sometimes, this can result in excessive sample heating and power consumption at the source, making the systems inefficient. In contrast, at any given instant, tunable source systems only generate and illuminate the sample with a very narrow band within the scan band.

Further, tunable source systems have advantages associated with detection efficiency. Relatively large detectors can be used to capture a larger fraction of the light that may have been scattered by or transmitted through the sample, since there is no need to capture light and then collimate the light for transmission through a tunable filter or to a grating, for example.

A number of general configurations are used for tunable source spectroscopy systems. The lasers have advantages in that very intense tunable optical signals can be generated. A different configuration uses the combination of a broadband source and a tunable passband filter, which generates the narrowband signal that illuminates the sample.

Historically, most tunable lasers were based on solid state or liquid dye gain media. While often powerful, these systems also have high power consumptions. Tunable semiconductor laser systems have the advantage of relying on small, efficient, and robust semiconductor sources. One configuration uses semiconductor optical amplifiers (SOAs) and microelectromechanical system (MEMS) Fabry-Perot tunable filters, as described in U.S. Pat. No. 6,339,603, by Flanders, et al., which is incorporated herein by this reference in its entirety. In other examples, intra cavity gratings are used to tune the laser emission.

In commercial examples of the broadband source/tunable filter source configuration, the tunable filter is an acousto-optic tunable filter (AOTF) and the broadband signal is generated by a diode array or tungsten-halogen bulb, for example. More recently, some of the present inventors have proposed a tunable source that combines edge-emitting, superluminescent light emitting diodes (SLEDs) and MEMS Fabry-Perot tunable filters to generate the tunable optical signal. See U.S. patent application Ser. No. 10/688,690, entitled Integrated Spectroscopy System, filed on Oct. 17, 2003, by Atia, et al., which is incorporated herein by this reference in its entirety. The MEMS device is highly stable, can handle high optical powers, and can further be much smaller and more energy-efficient than typically large and expensive AOTFs. Moreover, the SLEDS can generate very intense broadband optical signals over large bandwidths, having a much greater spectral brightness than tungsten-halogen sources, for example.

Moving from standard diode arrays and tungsten-halogen bulbs to edge-emitting devices such as superluminescent light emitting diodes (SLED), other edge emitting diodes including lasers, and semiconductor optical amplifiers (SOA) has the advantage that higher optical powers can be achieved.

One characteristic of these edge-emitting semiconductor devices such as SLEDs, diode lasers, and SOAs is that they usually emit single spatial mode light that is highly polarized. This is due to the nature of the semiconductor gain medium. The waveguide ridges are narrow preventing gain in higher order spatial modes. Also, current is usually injected from a top electrode through a quantum well structure to the bottom electrode. Thus, the gain medium is not circularly symmetric around the optical axis and thus light from these devices is usually highly polarized. Most often, it emits light in only a single polarization.

Even vertical surface emitting laser (VCEL) devices, where the gain region is more symmetric, tend to be highly polarized. This is because invariably one of the polarization modes encounters more loss so that the device runs in the other mode. In fact, it is common to fabricate the devices so that there is a strong preference for one of the modes to remove uncertainly as to in which mode the device operates.

Thus, in these systems, the broadband signal or the tunable signal that is transmitted to the sample is usually highly polarized and usually has only a single spatial mode.

For applications requiring a high signal-to-noise operation, when the source is highly polarized, polarization dependent loss is often a significant problem. The optical link between the tunable signal or broadband signal source and the sample and between the sample and the detector will have PDL. Moreover, this PDL may be dynamic over time especially in response to mechanical vibration or other changes to the fiber links or other optical elements in the path between the source and sample and from the sample to the detector. This PDL, in view of the highly polarized nature of the light from these semiconductor sources, can introduce spectral distortion in the measured signal and can detrimentally impact the signal-to-noise ratio and thus spectral performance of these systems.

To address the PDL problems U.S. patent application Ser. No. 11/018,687, filed Dec. 21, 2004, Polarization Controlling Fiber Probe for Semiconductor Source Spectroscopy System, by Flanders, et al., which is incorporated herein in its entirety by this reference, describes a semiconductor source spectroscopy system. It relies on using polarization control between the source and the sample and/or the sample and the detector.

SUMMARY OF THE INVENTION

Notwithstanding the use of polarization control in the optical fiber path between the source and the detector, the semiconductor source spectroscopy system can still be susceptible to baseline variation over time due to thermal effects. Research and modeling has identified the source of this thermally induced shifting to the single mode fiber connectors and single mode, polarization maintaining fiber connectors that are used to assemble the semiconductor source spectroscopy systems.

The invention is directed to controlling and minimizing this thermally induced baseline drift. It concerns a method and system for controlling the temperature of the single mode fiber connectors and single mode, polarization maintaining fiber connectors that are used in the semiconductor source spectroscopy systems to thereby stabilize the system against this drift.

In general according to one aspect, the invention features a semiconductor source spectroscopy system. It comprises a semiconductor source for generating a signal for illuminating a sample, a detector for detecting a signal from a sample generated by the illumination of the sample by the semiconductor source, and a fiber link including a fiber connector for guiding the signal between the semiconductor source and the detector. According to the invention, a temperature control system is provided for controlling a temperature of the fiber connector.

In one embodiment, the temperature control system comprises a control element for changing a temperature of the fiber connectors, a temperature detector for detecting a temperature of the fiber connectors, and a controller for driving the control element in response to the temperature detector.

The fiber link typically includes polarization controlling fiber and/or single mode fiber.

Depending on the implementation, the temperature control system comprises resistive heater or a thermoelectric cooler for changing a temperature of the fiber connectors.

In general according to another aspect, the invention features a spectroscopy method. The method comprising generating a signal for illuminating a sample using a semiconductor gain medium, detecting a signal from a sample generated by the illumination of the sample by the semiconductor gain medium with a detector, and guiding the signal between the semiconductor gain medium and the detector with a fiber link including a fiber connector. According to the invention, the method further includes controlling a temperature of the fiber connector.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
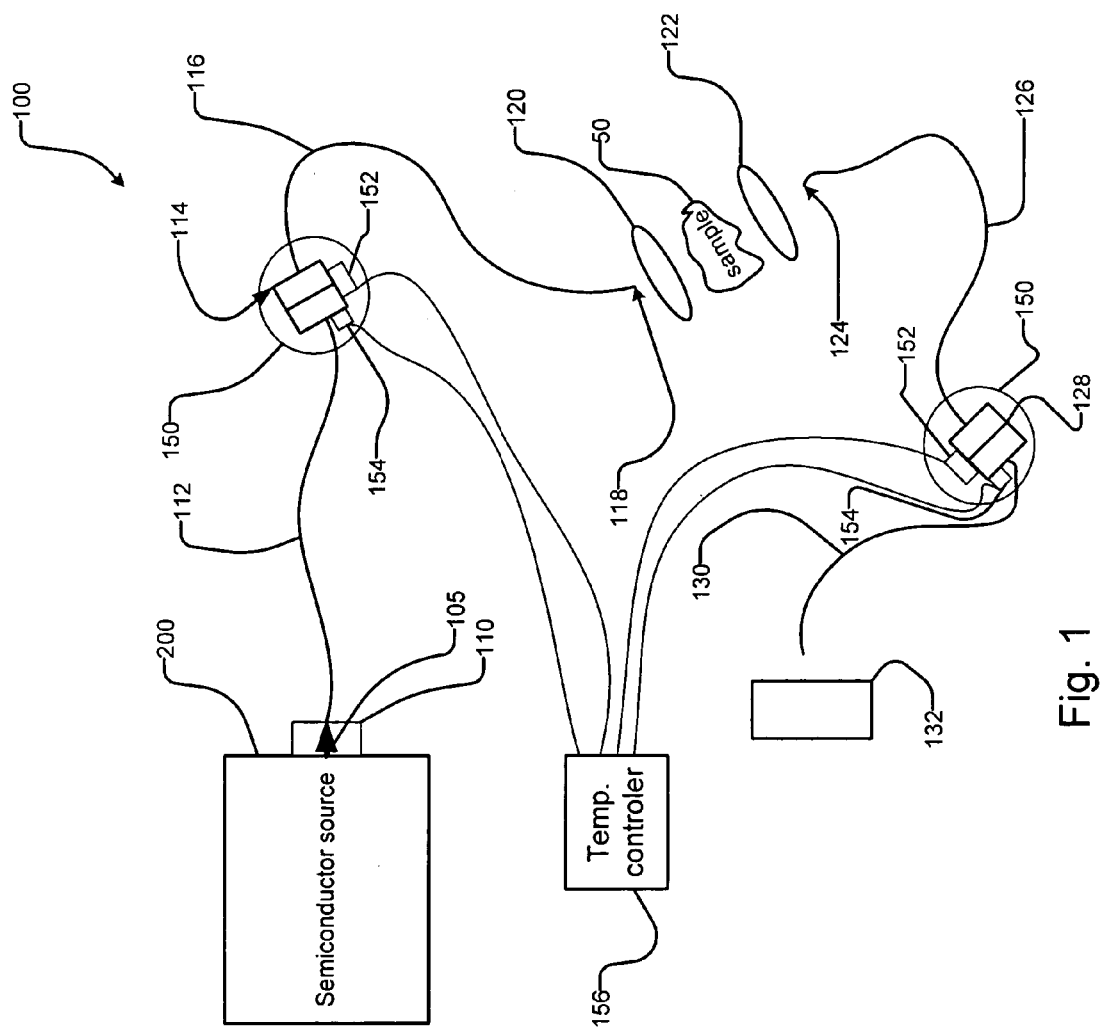
FIG. 1 is a block diagram illustrating a semiconductor source spectroscopy system with temperature controlled connectors according to the present invention.

FIG. 1 illustrates a semiconductor source spectroscopy system 100, which has been constructed according to the principles of the present invention.

Specifically, the system 100 comprises a semiconductor source 200.

In one example, this semiconductor source 200 is a source as described in incorporated U.S. patent application Ser. No. 10/688,690. In other examples, it comprises a semiconductor source as described in U.S. patent application Ser. No. 10/953,043, filed on Sep. 29, 2004, entitled "Semiconductor Laser with Tilted Fabry-Perot Tunable Filter" by Dale C. Flanders, et al., which is also incorporated herein by this reference in its entirety. In other examples, semiconductor source is a laser system in which the laser tuning element is a movable grating, such as a Littrow configuration. In a current embodiment, the semiconductor source is a source as described in U.S. patent application Ser. No. 11/158,617 filed Jun. 22, 2005, entitled Laser with Tilted Multi Spatial Mode Resonator Tuning Element, by Flanders, et al., which is incorporated herein by this reference in its entirety.

In other examples, the semiconductor source 200, rather than generating a tunable optical signal, generates a broadband signal. In this case, the semiconductor source comprises light emitting diode device. In one example, the semiconductor source comprises a superluminescent light emitting diode, which is usually an edge emitting device. Diode arrays are another alternative for the source.

In other examples, the source 200 comprises a standard edge emitting semiconductor laser or vertical surface emitting laser diode. In these examples, the system is often current or thermally tuned.

As a result, the signal 105, being either a broadband signal or a tunable signal, is generated by the semiconductor source 200 and is highly polarized and/or single spatial mode. Typically, it is only substantially a single polarization.

For example, light from the semiconductor source 200 can have a polarization extinction ratio (PER), that is ratio of powers in the two polarizations, of 10–25 dB. The present invention is applicable to these highly polarized source. More generally, the present invention is also applicable to less polarized sources since even a small PDL for a low PER source can introduce noise and impact the signal to noise ratio (SNR) of the spectroscopy system.

This signal 105 travels through, for example, a coupler 110 and a length of fiber 112, in one example.

In a current embodiment, the fiber 112 is polarization controlling fiber such as polarization maintaining single mode fiber. The fiber 112 and connector 114 is polarization maintaining fiber (PM) fiber FC/APC to SMA narrow key, fiber assembly.

The notion is that by using even some polarization controlling fiber between the semiconductor source 200 and the detector 132, polarization dependent loss (PDL) in the optical link and the components is managed since the polarization and thus PLD is stable with time and does not vary during scanning.

Generally, however, because of the nature of the sample, it is most important that the source side pigtails 112 and 116 are polarization controlling fiber and at least one of these is polarization controlling fiber.

Various types of polarization controlling fiber can be used. The most common type of polarization controlling fiber is polarization maintaining (PM) fiber, such as PANDA fiber. Here, the orthogonal polarization modes of the fiber have different propagation constants, which decouples the two polarizations on propagation and thus stabilizes and maintains the polarization distribution. In other examples, single polarization fiber or polarization stripping fiber is used. In these examples, the fiber only propagates a single polarization mode either because of the construction of the fiber, or the insertion of the components that remove light that is polarized along one of the axes.

It further travels through another length of fiber or fiber pigtail 116 that connects or carries the optical signal 105 to the sample 50, in some examples.

The sample optical fiber length 116 extends in the illustrated example from the FC/APC to SMA connector 114 to the pigtail's end 118. Here, the semiconductor source signal, being again either a broadband signal or a tunable signal is often columnated by, for example, a source-side lens element 120 for transmission to the sample 50.

Further, sample-side lens 122 is sometimes used to capture the signal from the sample 50 and couple it into a sample-side optical fiber 126, through endface 124.

Other couplers may be used, such as coupler 128, to connect the sample-side fiber length 126 to a detector optical fiber length 130. The signal is then directed to the detector 132.

In the case where the semiconductor source 200 is a tunable source, the detector 132 is usually a standard detector. In other examples, the detector 132 may be a tunable detector, especially where the semiconductor source 120 produces a broadband signal. Specifically, in one example it is a tunable detector spectroscopy system as disclosed in U.S. patent application Ser. No. 10/688,690 filed Oct. 17, 2003. In still further examples, it can be a grating-based detector system that has a grating to disperse the broadband signal to an array detector.

It should be noted that the specific nature of the source 200 and the detector 132 is not critical. Instead, the invention is relevant to semiconductor sources, and specifically semiconductor sources that generate highly polarized broadband or tunable signals and/or optical signals that have a single spatial mode. The relevance of the detector is that it may be polarization anisotropic, having a certain degree of PDL.

The PDL in these various components between the semiconductor source 200 and the detector 132 should be managed. Specifically, the source side connector 114 and the sample side detector 132 may have different polarization characteristics and specifically polarization dependent loss. Moreover, the PDL for these detectors may vary with the spectrum. The source side lens 120 and the detector side lens 122 can further have PDL. Moreover, the fiber end faces 118 and 124 may further have PDL problems.

The use of polarization controlling fiber between the semiconductor source 200 and the detector 132 help to manage the PDL. In some embodiments, the first source side fiber pigtail 112 and the second source side fiber pigtail 116 are constructed from polarization controlling fiber, such a PM fiber. Moreover, the sample side pigtail 126 and the detector side pigtail 130 are sometimes also comprised of polarization controlling fiber. However, in other examples, only one or a few of these pigtails is polarization controlling fiber.

Nonetheless, the systems would sometimes still exhibit baseline shifts over time. A proportion of these shifts were traced to temperature shifts in the connectors 114, 128. Currently, FC/APC and SMA connectors are used, but the effect has been seen in other fiber connector designs.

Figures 2, 3:
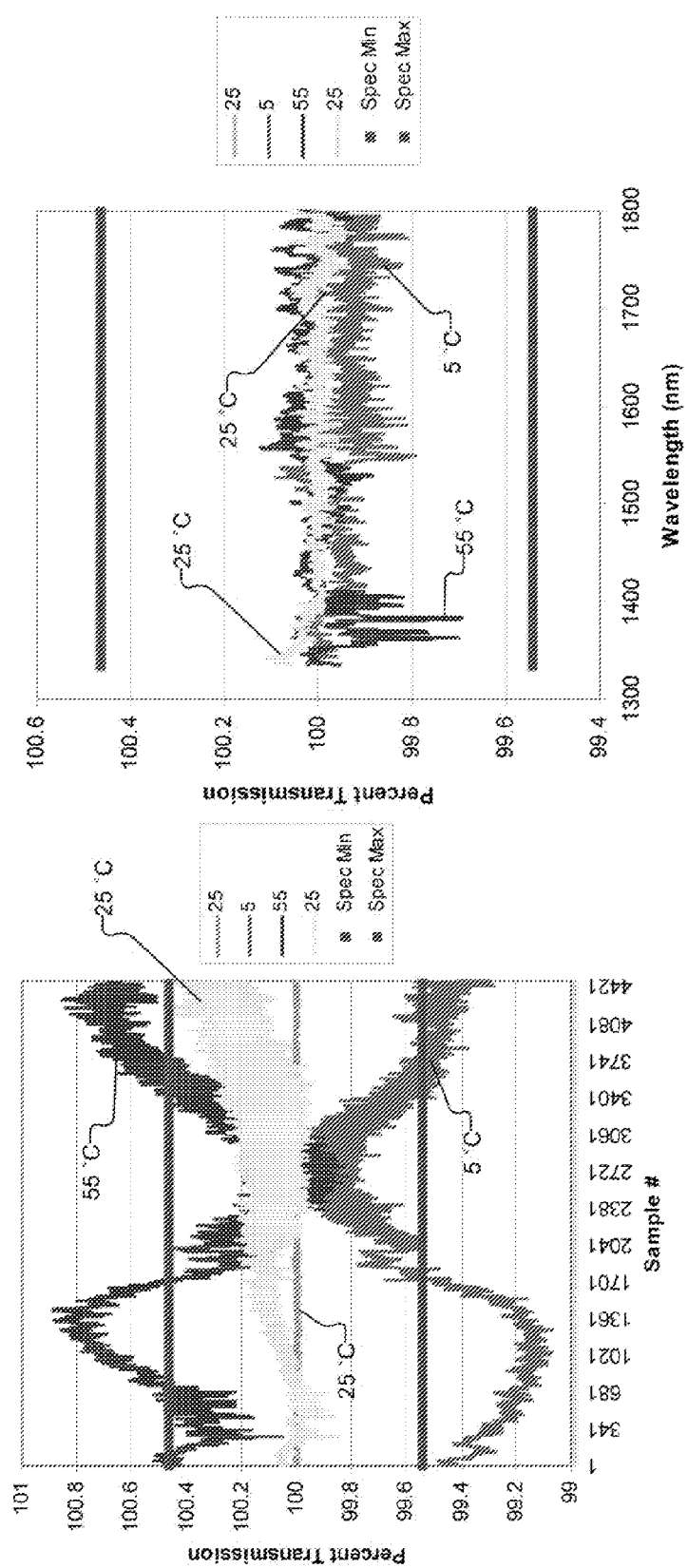
FIG. 2 is a plot of changes in percent transmission as a function of wavelength, measured in analog-to-digital detector counts illustrating the baseline shifts at different connector temperatures.
FIG. 3 is a plot of changes in percent transmission as a function of wavelength, measured in nanometers, illustrating the baseline shifts at different ambient temperatures when connector temperature is controlled.

FIG. 2 illustrates the baseline shifts, changes in transmission as a function of wavelength, measured in analog-to-digital detector counts. For example, at 55° C., the transmission varies by about 0.8%, whereas at 25° C. the variation is lower, about 0.4.

If these variations were stable at different temperatures, then they could be addressed with system calibration, but the fact they change makes them difficult to address, especially in systems that must function over wide swings in environmental temperature.

Careful analysis of the operation of the system traces at least some of the baseline variation to the temperature of the connectors, such as connectors 114, 128.

Returning to FIG. 1, according to the invention, the temperature of the connectors is controlled to be stable or at least known using a connector temperature control system. In one embodiment, the connectors have temperature detectors 154 for determining the connector temperature. Examples include thermistors and thermocouples. The temperature information is used by a temperature controller 156 to drive temperature control elements 152 for each connector 114, 128 using a feedback control scheme. In a preferred embodiment, each connector 114, 150 is further preferably insulated to decrease the power consumption of the control elements 152 and improve the stability of the feedback control.

There are different implementations of the temperature control elements 152. In some examples, resistive heaters are used, such as thermofoil devices. In other examples, thermoelectric coolers are used. If possible, the temperature control elements of the source 200 can function in a dual role as controlling the source temperature and the connector temperature.

FIG. 3 illustrates the baseline shifts, changes in transmission as a function of wavelength, measured in nanometers. This plot shows the shift with ambient temperature with control of the connector temperatures. The system exhibits much lower variation.

The reason for the baseline shift when the temperature of the connectors is changing with changes in the environmental temperature appears to result from slight changes in the angular alignment between the fiber ends as the metal of the connectors expands and contracts with the temperature changes. This can result in a PDL based problem when polarization controlling fiber is used. However, similar problems are manifested when standard single mode fiber is used. Temperature changes cause slight changes in the core to core alignment and coupling of the fibers, which leads to the baseline shifts.

While this invention has been particularly shown and described with references to preferred embodiments thereof, it will be understood by those skilled in the art that various changes in form and details may be made therein without departing from the scope of the invention encompassed by the appended claims.

What is claimed is:

1. A semiconductor source spectroscopy system, comprising:
   a semiconductor source for generating a signal for illuminating a sample;
   a detector for detecting a signal from the sample generated by the illumination of the sample by the semiconductor source;
   a fiber link including a fiber connector for guiding the signal between the semiconductor source and the detector; and
   a temperature control system for controlling a temperature of the fiber connector.

2. A system as claimed in claim 1, wherein the temperature control system comprises:
   a control element for changing a temperature of the fiber connector;
   a temperature detector for detecting a temperature of the fiber connector; and
   a controller for driving the control element in response to the temperature detector.

3. A system as claimed in claim 1, wherein the fiber link includes polarization controlling fiber.

4. A system as claimed in claim 3, wherein the polarization controlling fiber is polarization maintaining fiber.

5. A system as claimed in claim 3, wherein the polarization controlling fiber is optical fiber that propagates only a single polarization.

6. A system as claimed in claim 1, wherein the semiconductor source comprises a superluminescent light emitting diode.

7. A system as claimed in claim 1, wherein the semiconductor source comprises a tunable semiconductor laser source comprising a semiconductor optical amplifier and an intracavity tunable element.

8. A system as claimed in claim 7, wherein the intracavity tunable element is a Fabry-Perot tunable filter.

9. A system as claimed in claim 7, wherein the intracavity tunable element is a microelectromechanical Fabry-Perot tunable filter.

10. A system as claimed in claim 7, wherein the intracavity tunable element is a grating.

11. A system as claimed in claim 1, wherein the semiconductor source comprises a broadband edge emitting, light emitting diode, and the system further comprises a tunable filter for filtering the source signal prior to illuminating the sample making a predispersive spectroscopy system.

12. A system as claimed in claim 1, wherein the semiconductor source comprises an edge emitting, light emitting diode, and the system further comprises a tunable filter for filtering a signal from the sample prior to detection by the detector making a postdispersive spectroscopy system.

13. A system as claimed in claim 1, wherein the temperature control system comprises resistive heater for changing a temperature of the fiber connectors.

14. A system as claimed in claim 1, wherein the temperature control system comprises thermoelectric cooler for changing a temperature of the fiber connectors.

15. A spectroscopy method, comprising:
    generating a signal for illuminating a sample using a semiconductor gain medium;
    detecting a signal from a sample generated by the illumination of the sample by the semiconductor gain medium with a detector;
    guiding the signal between the semiconductor gain medium and the detector with a fiber link including a fiber connector; and
    controlling a temperature of the fiber connector.

16. A method as claimed in claim 15, wherein the step of guiding the signal comprises guiding the signal in polarization controlling fiber.

17. A method as claimed in claim 15, wherein the step of guiding the signal comprises guiding the signal in single mode fiber.

* * * * *

UNITED STATES PATENT AND TRADEMARK OFFICE
CERTIFICATE OF CORRECTION

PATENT NO. : 7,248,369 B2 Page 1 of 1
APPLICATION NO. : 11/203810
DATED : July 24, 2007
INVENTOR(S) : Randal A. Murdza It is certified that error appears in the above-identified patent and that said Letters Patent is hereby corrected as shown below:

On the Title Page (73) Assignee, line 2, delete "MN" and insert --MA--.

Signed and Sealed this

Eleventh Day of September, 2007

JON W. DUDAS
*Director of the United States Patent and Trademark Office*